(12) United States Patent
Turner

(10) Patent No.: US 12,274,270 B1
(45) Date of Patent: Apr. 15, 2025

(54) FIELD DRESSING TOOL

(71) Applicant: Joe M. Turner, Upton, WY (US)

(72) Inventor: Joe M. Turner, Upton, WY (US)

( * ) Notice: Subject to any disclaimer, the term of this patent is extended or adjusted under 35 U.S.C. 154(b) by 258 days.

(21) Appl. No.: 17/519,008

(22) Filed: Nov. 4, 2021

(51) Int. Cl.
| | | |
|---|---|---|
| *A22C 17/06* | (2006.01) | |
| *A22B 5/16* | (2006.01) | |
| *B26B 9/02* | (2006.01) | |
| *B26B 23/00* | (2006.01) | |

(52) U.S. Cl.
CPC .............. *A22B 5/168* (2013.01); *A22C 17/06* (2013.01); *B26B 9/02* (2013.01); *B26B 23/00* (2013.01)

(58) Field of Classification Search
CPC .. A22B 5/16; A22B 5/168; B26B 3/00; B26B 9/00; B26B 9/02; B26B 23/00; A22C 17/06
USPC .............. 452/6, 17, 102–105, 125, 137, 132
See application file for complete search history.

(56) References Cited

U.S. PATENT DOCUMENTS

| | | | | |
|---|---|---|---|---|
| 3,187,354 A | * | 6/1965 | Frisbie | B26B 23/00 30/294 |
| 3,599,255 A | * | 8/1971 | Carroll, Sr. | B25F 1/00 254/26 R |
| 5,033,987 A | * | 7/1991 | Bloch | B26B 27/00 452/132 |
| D352,987 S | | 11/1994 | Stanlkey | |
| 5,412,871 A | * | 5/1995 | Reyburn | B67B 7/30 30/294 |
| 5,453,043 A | * | 9/1995 | Monson | A22B 5/205 30/162 |
| 5,529,534 A | * | 6/1996 | Adams | A22C 25/006 30/158 |
| 6,052,908 A | * | 4/2000 | Harman | A22B 5/168 30/294 |
| D539,868 S | | 4/2007 | Luster | |
| 7,214,127 B1 | * | 5/2007 | Thompson | A22B 5/168 452/103 |
| 7,217,182 B1 | | 5/2007 | McConnell et al. | |
| 7,578,731 B1 | * | 8/2009 | Moore | B26B 1/10 452/103 |
| 7,597,614 B2 | | 10/2009 | Forbes et al. | |
| 8,024,994 B2 | * | 9/2011 | St. John | B25F 1/00 362/120 |
| 8,066,557 B2 | | 11/2011 | Tarrant | |
| 8,235,775 B1 | * | 8/2012 | Moy | A22B 5/0047 452/160 |
| 8,382,562 B1 | * | 2/2013 | Lavretsky | A22C 17/0046 452/137 |
| D684,659 S | | 6/2013 | Quill | |
| 9,504,261 B1 | | 11/2016 | Collins | |
| 10,834,930 B2 | | 11/2020 | Johnson | |

* cited by examiner

*Primary Examiner* — David J Parsley
(74) *Attorney, Agent, or Firm* — Cramer Patent & Design, PLLC.; Aaron R. Cramer

(57) ABSTRACT

A field dressing tool is a hatchet shaped tool having a U-shaped cutting tool opposite the hatchet blade. The interior of the U-shaped cutting tool has sharp edge to facilitate cutting of bone. The sharpened edge may extend to form a hook. The handle may include a stem that extends from the head and a gripping portion encircling a portion of the stem that facilitates grabbing and manipulating the handle.

1 Claim, 10 Drawing Sheets

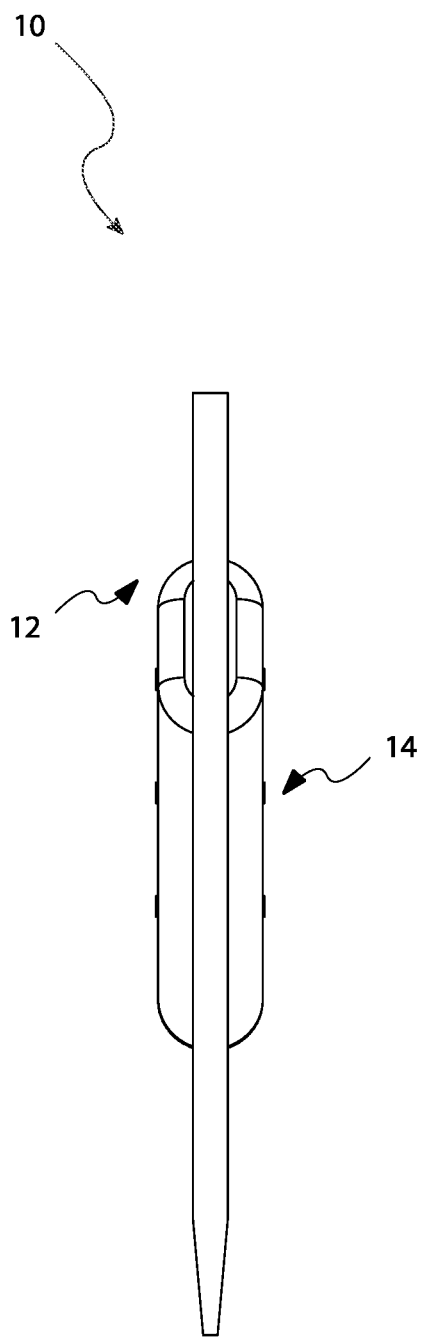
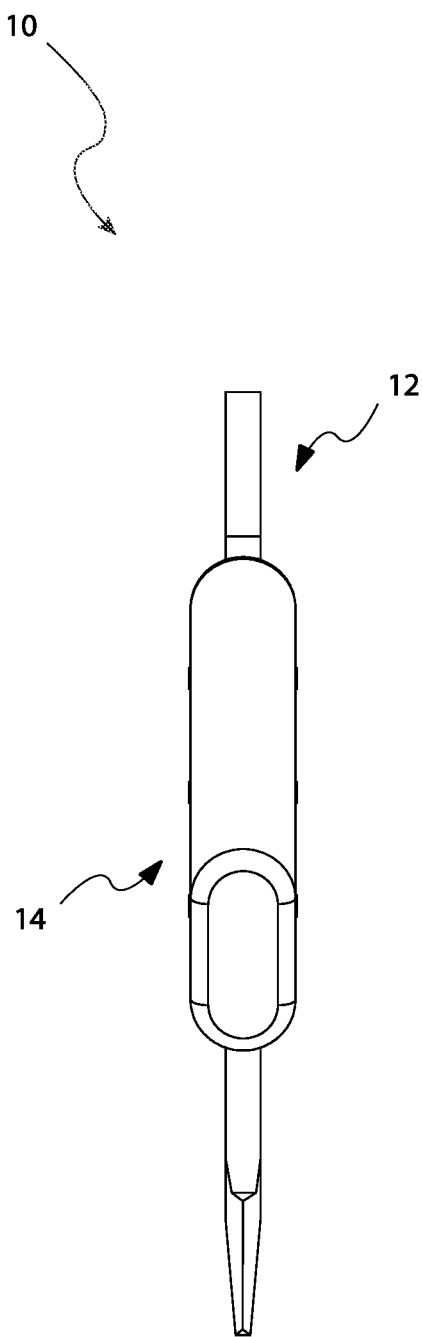
FIG. 6
FIG. 7

FIELD DRESSING TOOL

FIELD OF THE INVENTION

The presently disclosed subject matter is directed to field dressing tool for game animals.

BACKGROUND OF THE INVENTION

People all over the world actively participate in some form of hunting. Whether big or small game—with rifles, bows or traps, hunting is a popular form of outdoor activity enjoyed by millions.

There are many ways to dress a larger animal with some hunters preferring to dress the game personally and in the field. While such tools exist, such as a FieldtTorq® knife, such tools may prove difficult to use for the average hunter. Accordingly, there exists a need for a means by which a large game animal may be field dressed in a manner that is easy and efficient. The field dressing tool fulfills this need.

SUMMARY OF THE INVENTION

The principles of the present invention provide for a field dressing tool that has, a head having a body with a first end and a second end, and a handle extending from the head. The first end includes a surface.

The first end may include an additional surface disposed about the surface that forms a wall. The wall may include a plurality of pointed edges disposed on either side of the surface. The pointed edges may extend an equal distance. The second end may include a planar surface. The planar surface may be configured as an impact surface to receive an impact from a hammer. The surface may have an oval shape. The surface may have an oblong shape. The surface may have a triangular shape. The surface may have a rectangular shape. The surface may have a square shape. The surface may have a polygonal shape.

The surface may have an irregular shape. The surface may have a uniform shape. The surface may have a non-uniform shape. The surface may have a variable shape. The surface may have a tapered shape. The surface may include a sharpened edge to facilitate cutting of bone. The sharpened edge may extend to form a hook. The handle may include a stem that extends from the head and a gripping portion encircling a portion of the stem that facilitates grabbing and manipulating the handle.

BRIEF DESCRIPTION OF THE DRAWINGS

These and other features, aspects, and advantages of the present disclosure will become better understood with regard to the following description, appended claims, and accompanying drawings where:

FIG. 6 is a top view of the field dressing tool, according to an embodiment of this disclosure;

FIG. 7 is a bottom view of the field dressing tool in use, according to an embodiment of this disclosure;

Figure 1:
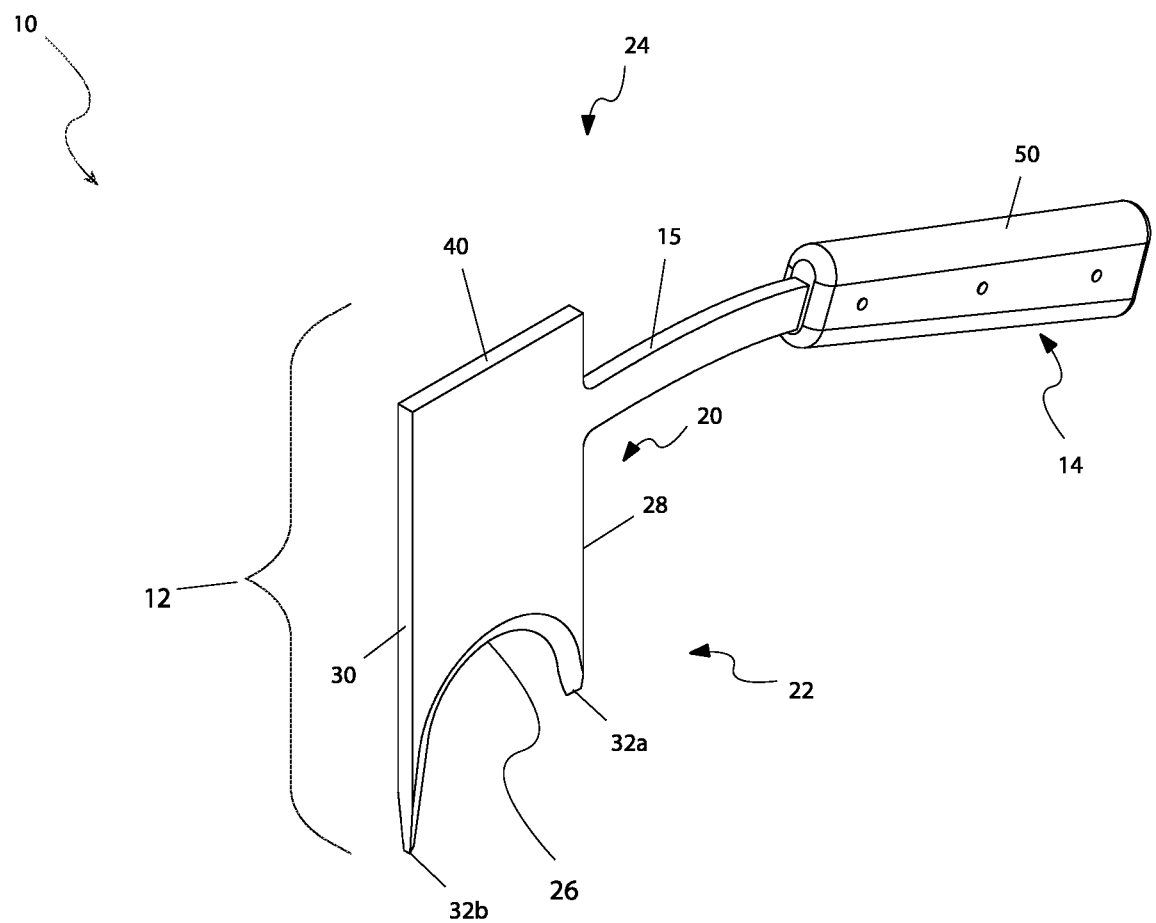
FIG. 1 is a perspective view of a field dressing tool, according to an embodiment of this disclosure.
Figure 2:
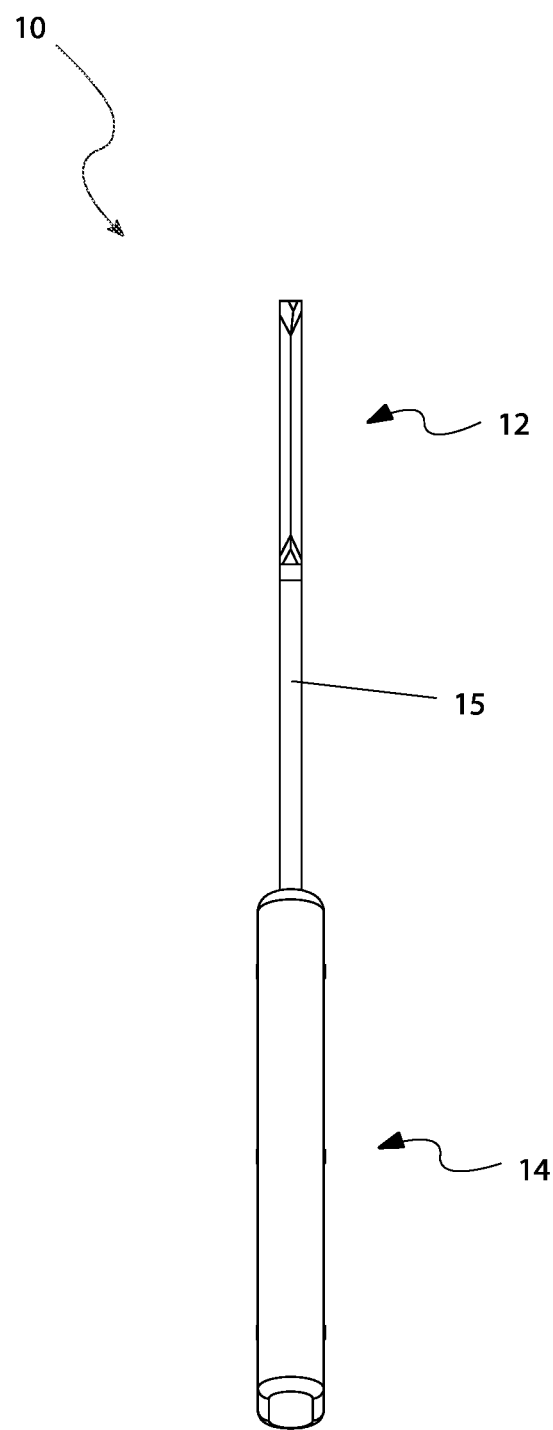
FIG. 2 is a rear view of the field dressing tool, according to an embodiment of this disclosure.
Figure 3:
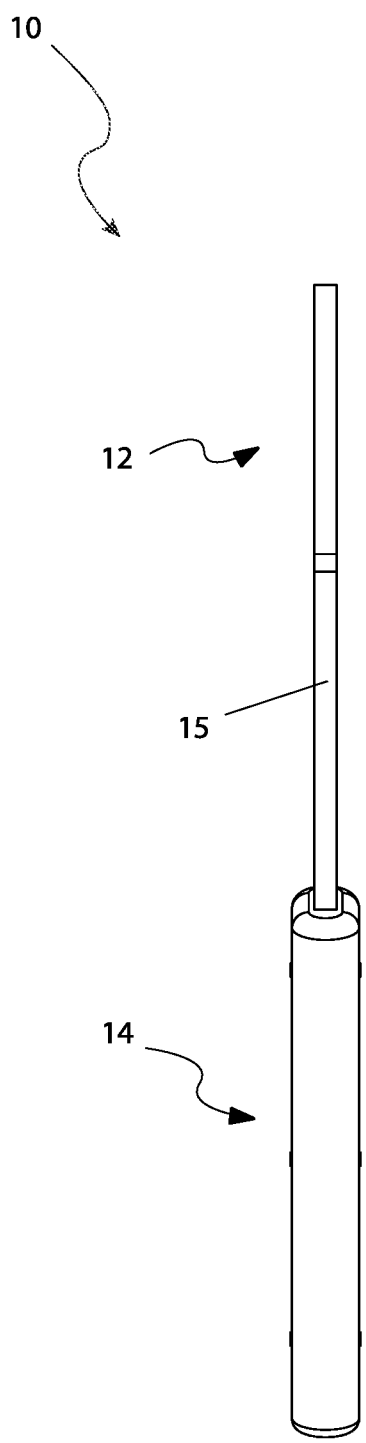
FIG. 3 is a front view of the field dressing tool, according to an embodiment of this disclosure.
Figure 4:
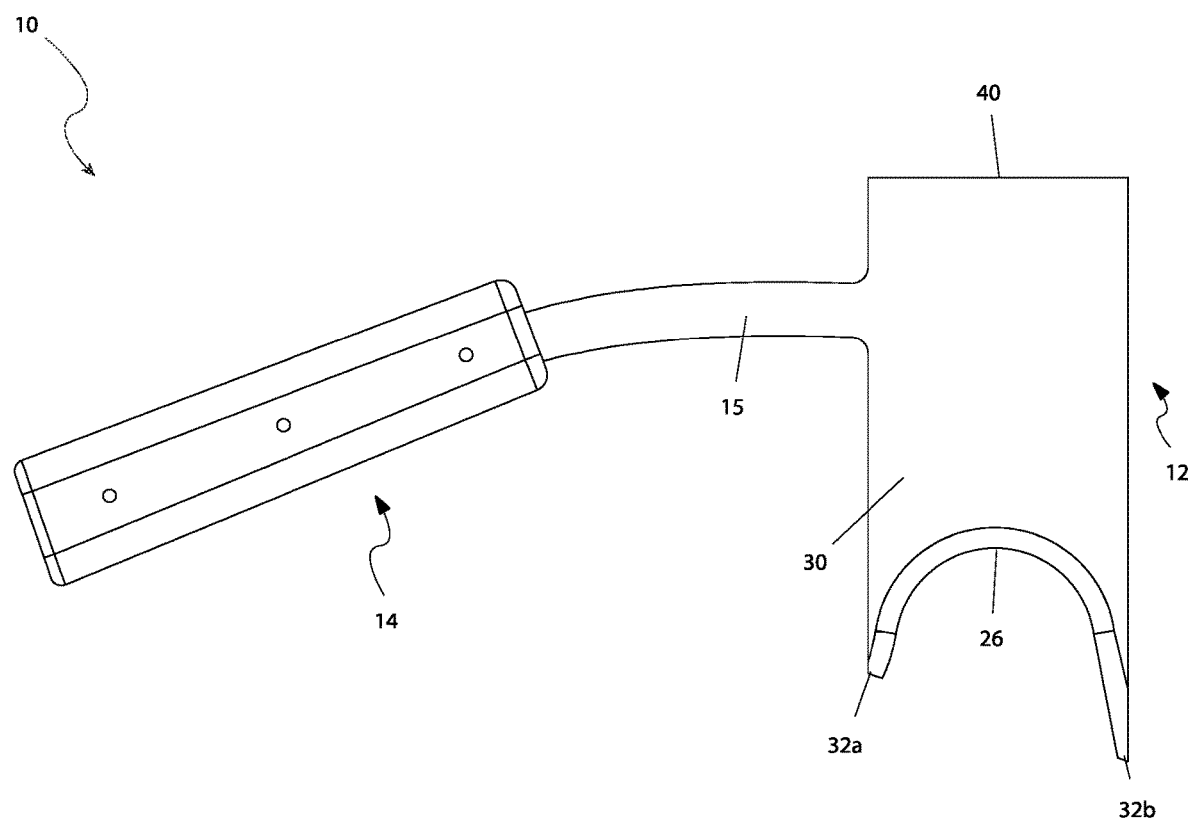
FIG. 4 is a side view of the field dressing tool, according to an embodiment of this disclosure.
Figure 5:
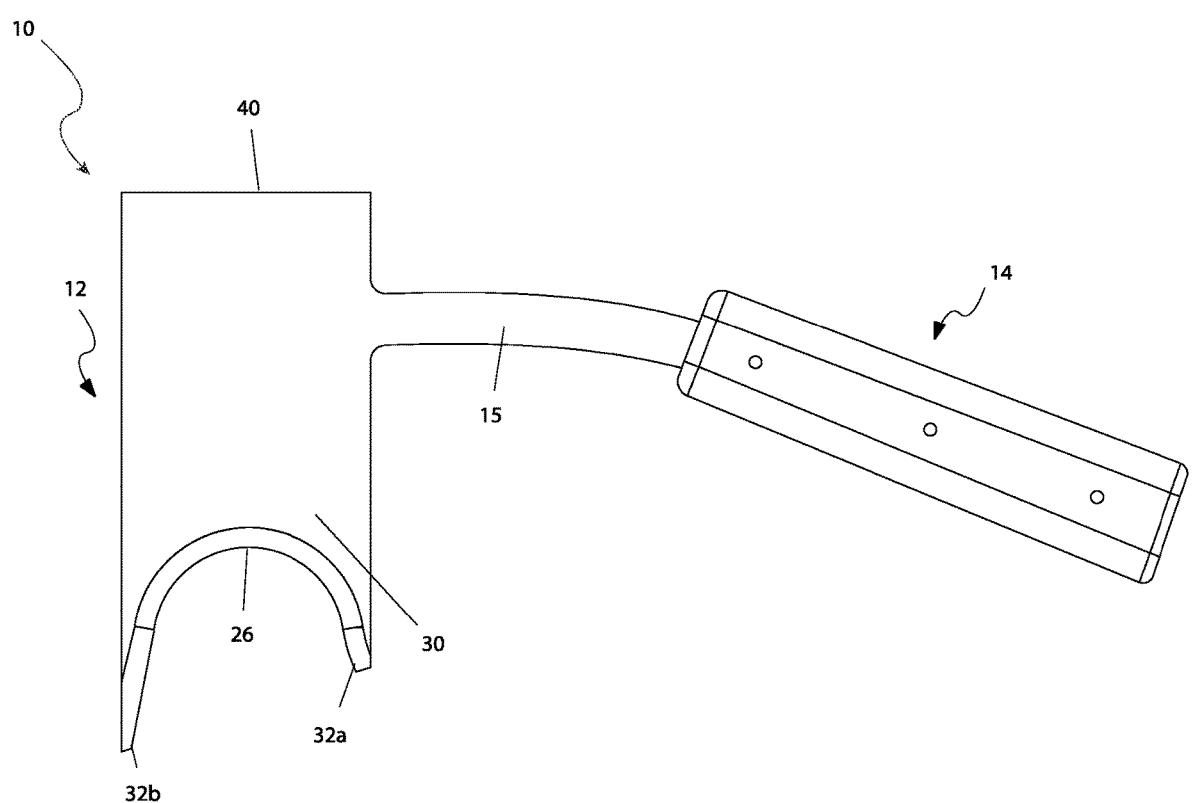
FIG. 5 is an opposite side view of the field dressing tool, according to an embodiment of this disclosure.
Figure 8:
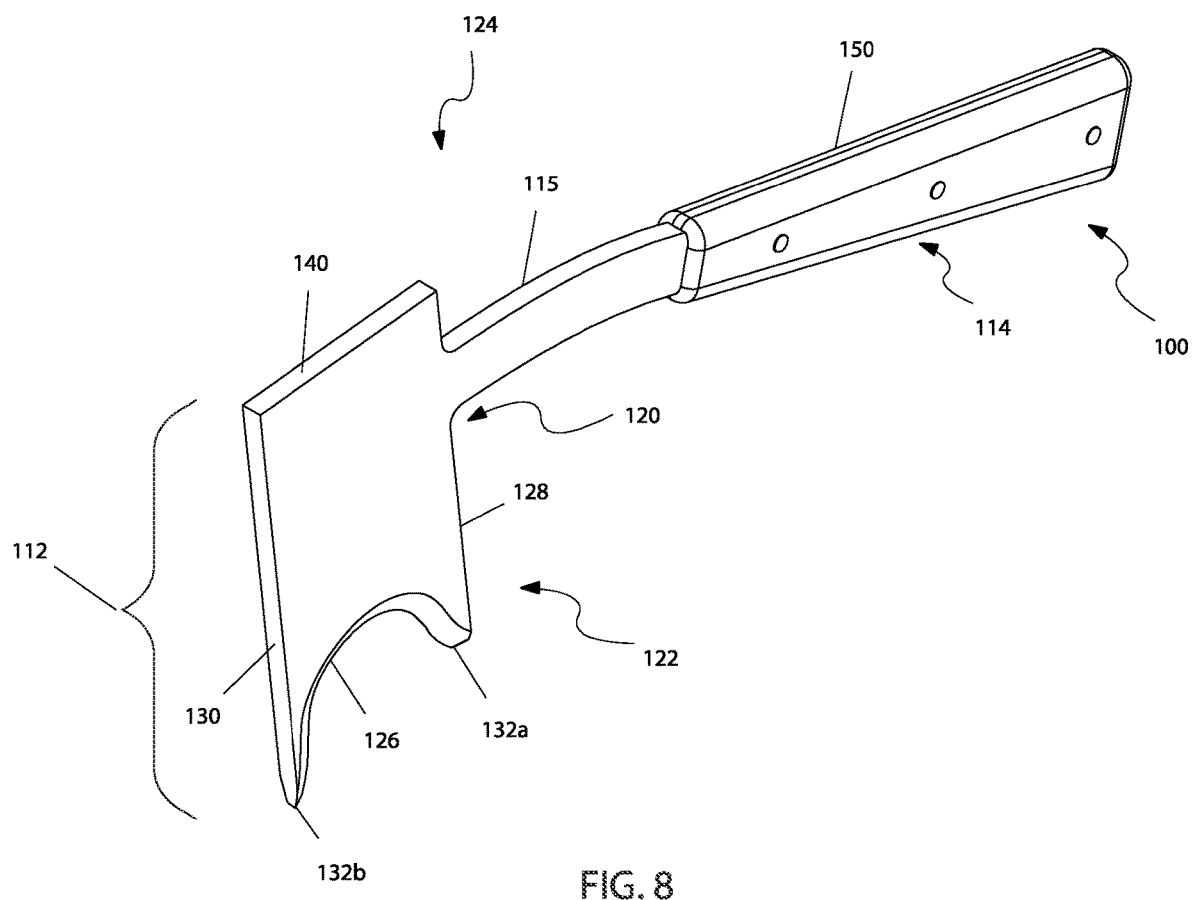
FIG. 8 is a perspective view of an alternate field dressing tool, according to an alternate embodiment of this disclosure.
Figure 9:
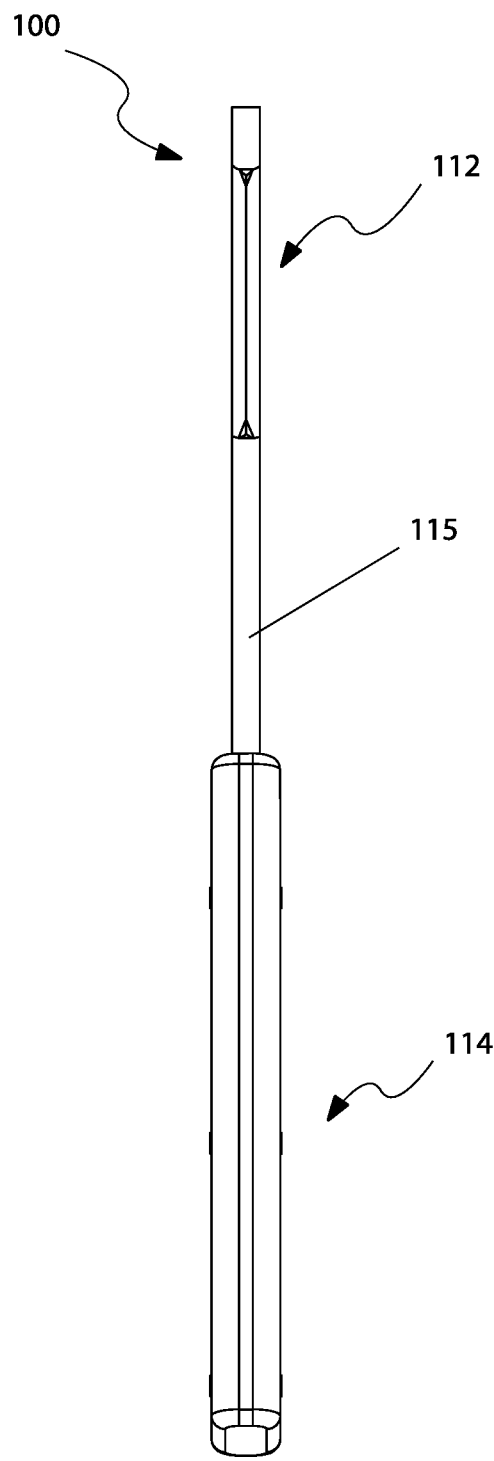
FIG. 9 is a rear view of the alternate field dressing tool, according to an alternate embodiment of this disclosure.
Figure 10:
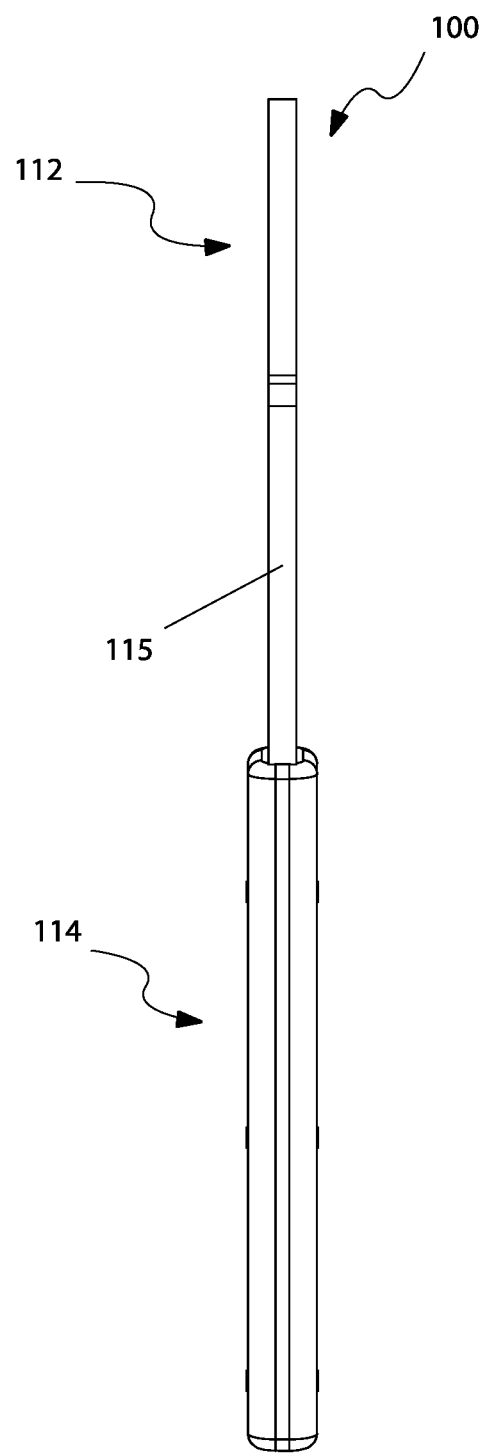
FIG. 10 is a front view of the alternate field dressing tool, according to an alternate embodiment of this disclosure.
Figure 11:
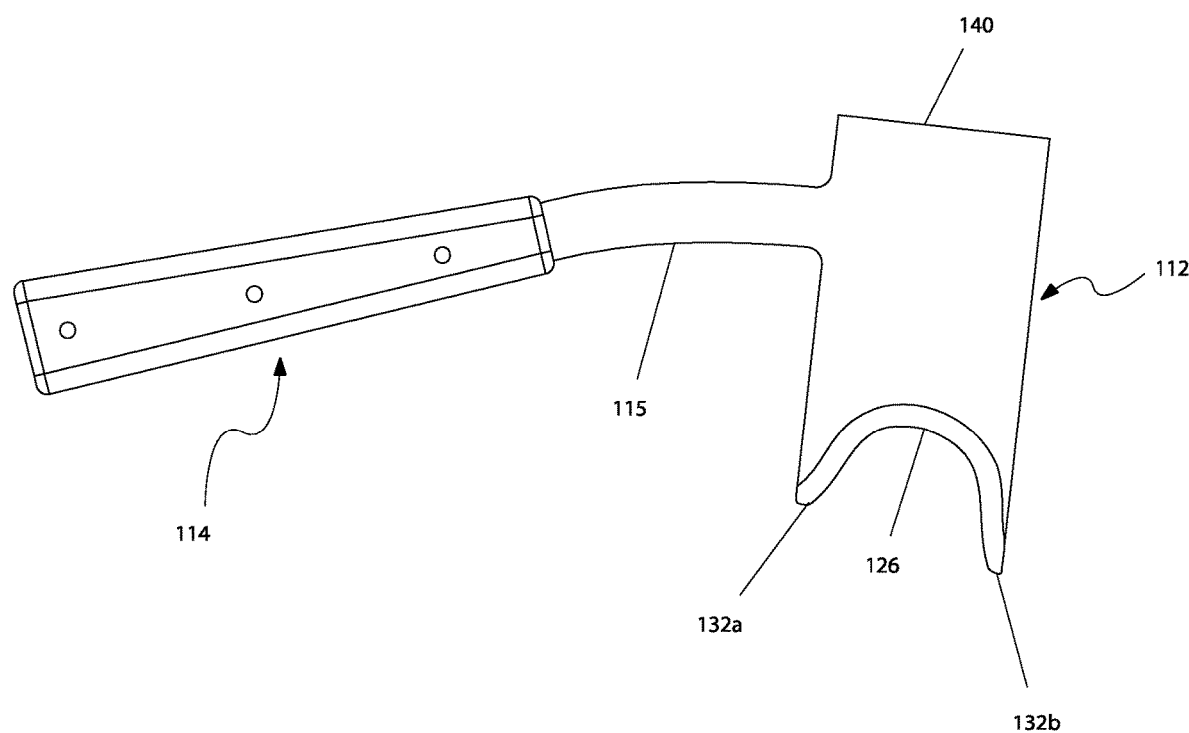
FIG. 11 is a side view of the alternate field dressing tool, according to an alternate embodiment of this disclosure.
Figure 12:
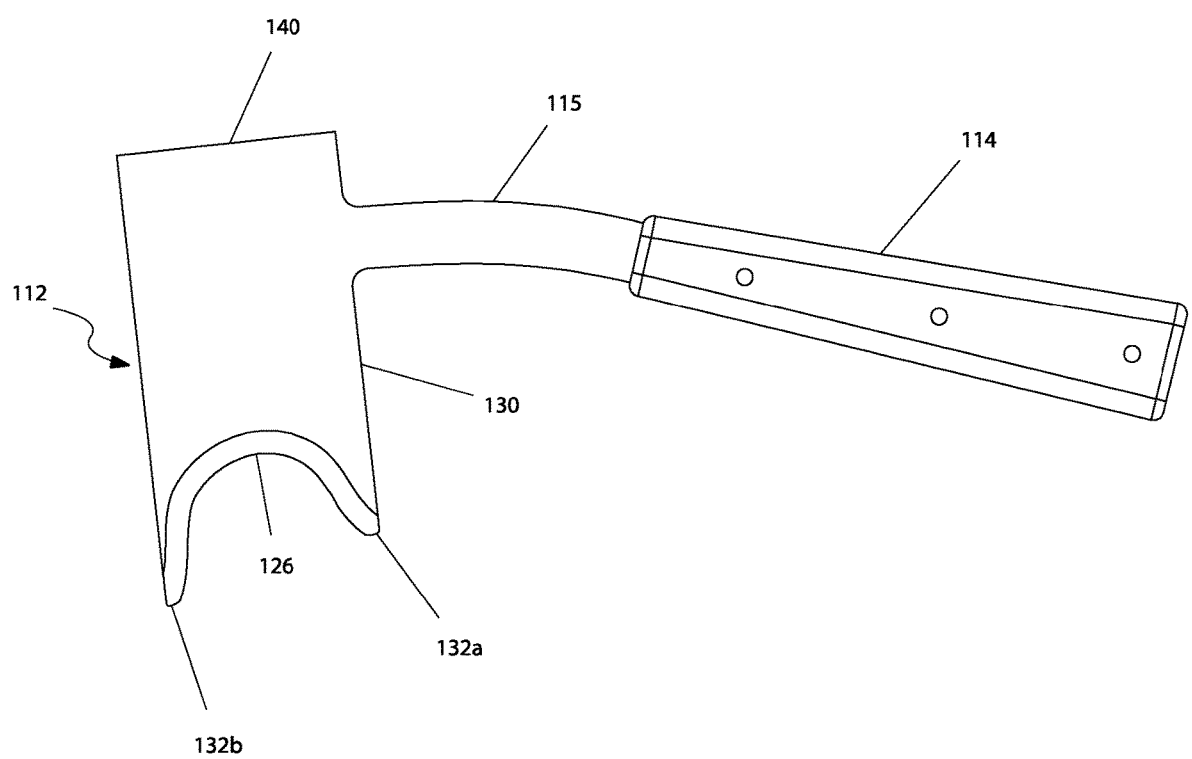
FIG. 12 is an opposite side view of the alternate field dressing tool, according to an alternate embodiment of this disclosure.
Figure 13:
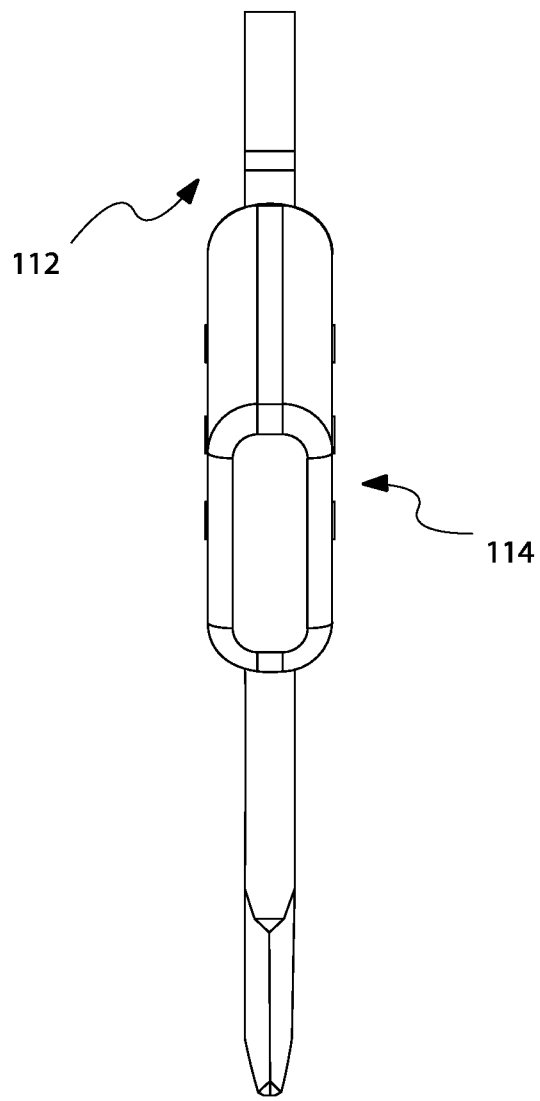
FIG. 13 is a top view of the alternate field dressing tool, according to an alternate embodiment of this disclosure.
Figure 14:
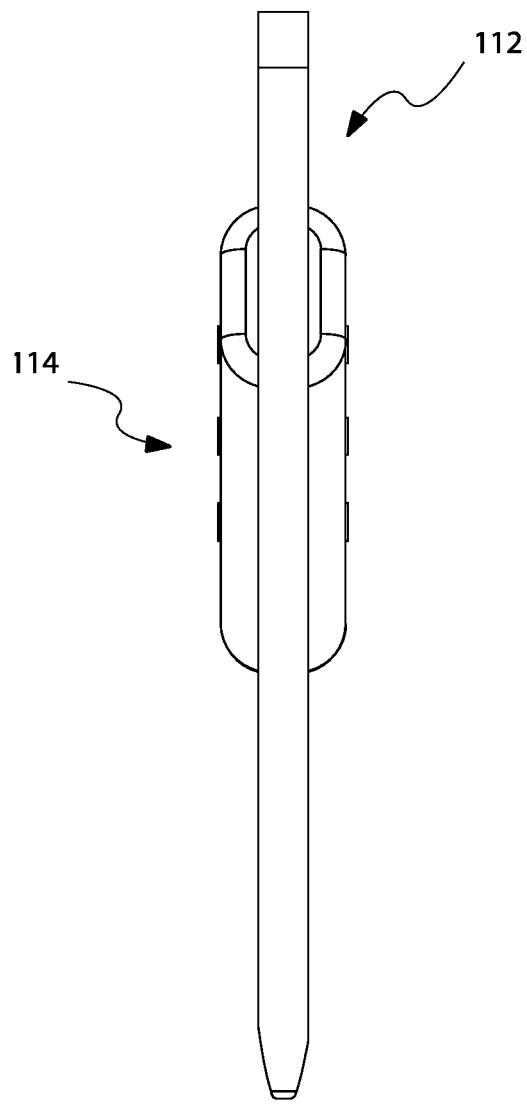
FIG. 14 is a bottom view of the alternate field dressing tool, in use according to an alternate embodiment of this disclosure.

DESCRIPTIVE KEY 10 field dressing tool
12 head
14 handle
15 tang
20 body
22 first end
24 second end
26 concave surface
28 surface
30 wall
32 edge
40 impact surface
110 alternate field dressing tool
112 alternate head
114 alternate handle
115 alternate tang
120 alternate body
122 alternate first end
124 alternate second end
126 alternate concave surface
128 alternate surface
130 alternate wall
132 alternate edge
140 alternate impact surface

DETAILED DESCRIPTION

The following disclosure is provided to describe various embodiments of a field dressing tool 10, 100 configured for use for game, for example a deer, field dressing. In some embodiments, the tool 10, 100 is configured to allow for dressing and resist and/or prevent rupture of a bladder and or urethra when hind quarters of a deer, for example, are spread apart for removing intestines. Skilled artisans will appreciate additional embodiments and uses of the present invention that extend beyond the examples of this disclosure. Terms included by any claim that may be presented in any yet-to-be-filed non-provisional patent application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one (1) of A, B, and C" should be read to permit any of A, B, or C singularly or in combination with the remaining elements. Additionally, such groups may include multiple instances of one (1) or more element in that group, which may be included with other elements of the group. All numbers, measurements, and values are given as approximations unless expressly stated otherwise.

Various aspects of the present disclosure will now be described in detail, without limitation. Skilled readers should not view the inclusion of any alternative labels as limiting in any way. Referring now to FIGS. 1-7, an illustrative field dressing tool 10 will now be discussed in more detail.

Tool 10 includes a head 12 and a handle 14. Head 12 includes a body 20 having a first end 22 and a second end 24. First end 22 includes a concave surface 26, as shown in FIG. 1. Surface 26 includes a sharpened edge 32 to facilitate cutting of bone. In some embodiments, edges 32 extend with varying lengths to form a hook. In some embodiments, surface 26 may include various shapes, for example, oval, oblong, triangular, rectangular, square, polygonal, irregular, uniform, non-uniform, variable, and/or tapered to facilitate placement of surface 26 against a portion of a body of the deer.

First end 22 includes a surface 28 disposed about concave surface 26 that forms a wall 30. Wall 30 includes relatively pointed edges 32 disposed on either side of the concave surface 26, as shown in FIG. 1. In some embodiments, edges 32 extend an equal distance.

Second end 24 includes a relatively planar surface 40. Surface 40 is configured as an impact surface, for example, to receive an impact from a hammer. In some embodiments, surface 40 may include various shapes, for example, oval, oblong, triangular, rectangular, square, polygonal, irregular, uniform, non-uniform, variable, and/or tapered.

Handle 14 extends from head 12. Handle 14 includes a stem 15 that extends from the head 12 and a gripping portion 50 encircling a portion of the stem 15 and configured to facilitate grabbing and manipulating the tool 10.

In operation, tool 10 is utilized for big game field dressing, such as moose, bear, and buffalo. Tool 10 is configured to prevent rupture of bladder and or urethra when hind quarters of the deer are spread apart for removing intestines. For example, a cut is made down to a pelvic bone that protects the discharge canals of urine and excrement. The cut exposes bone. Tool 10 is positioned just under the bone such that concave surface 26 abuts the bone. Wall 30 acts as a barrier. A hammer or other impact tool is utilized to apply a force to surface 40 to split the bone. Splitting the bone allows the intestines to be removed without tainting the meat with urine or excrement. The sizing of head 10 can be altered for various sized game, for example, an elk. In some embodiments, tool 10 can be made of high carbon steel or knife blade stainless steel.

In some embodiments, when dressing a male deer, the male genitals will be cut around and peeled back down to the anus. With the hind legs spread apart the exposed meat is cut down to the pelvis bone. With the pelvis bone exposed, tool 10 is inserted just under the exposed pelvis bone and oriented such that surface 26 is positioned towards the rear of the deer and surface 40 is oriented towards the head of the deer. While holding handle 14, surface 40 is struck to split the pelvic bone allowing removal of the genitals and anus without rupturing the bladder or urethra, avoiding exposing meat to urine or excrement. Tool 10 then can be turned around and used as gut hook. For example, surface 26 can be placed under deer hide facing toward head and edges 32 can be utilized to split the rest of the deer hide. With the intestines now exposed the intestines can be removed through the pelvis. This allows for a sanitary method to filed dress game.

Referring now to FIGS. 8-14, an alternate field dressing tool 100 is similarly shaped, but more adequately used to field dress large game that is somewhat smaller than that in the previously described tool 10. The alternate field dressing tool 100 is best suited for field dressing deer, antelope, and elk. Both tools 10, 100 are approximately 10 inches (10 in.) in length. Both heads 12, 112 are fabricated with one-quarter inch (¼ in.) thick leaf spring high carbon steel. The head 12 is approximately two and one-half inches (2½ in.) in length and seven and one-half inches (7½ in.) in width. The alternate head 112 is approximately two inches (2 in.) in length and four inches (4 in.) in width. The tangs 15, 115 are a fabricated with one-half inch (½ in.) wide and one-quarter inch (¼ in.) thick stainless steel plate.

While various aspects of the present invention have been described in the above disclosure, the description of this disclosure is intended to illustrate and not limit the scope of the invention. The invention is defined by the scope of the claims of a corresponding nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of a corresponding nonprovisional utility patent application.

What is claimed is:

1. A field dressing tool consisting of:
   a head having a first end and a second end;
   a handle extending from the head, the first end of the head including:
      a concave surface configured to facilitate cutting of bone;
      a sharpened edge extending with varying lengths to form a hook, and,
      a wall disposed about the concave surface forming pointed edges on either side of the concave surface, the second end of the head including a planar impact surface configured to receive an impact from a hammer to split bone;
   the handle comprising:
      a stem extending from the head; and,
      a gripping portion encircling a portion of the stem and configured to facilitate grabbing and manipulating the tool; and,
   wherein the tool is configured to be positioned under a pelvic bone with the concave surface abutting the bone and the planar impact surface oriented to receive a force to split the bone, allowing removal of intestines without contamination from urine or excrement;
   wherein the head is made of high carbon steel or knife blade stainless steel; and,
   wherein the concave surface and planar impact surface may include various shapes, selected from the group consisting of oval, oblong, triangular, rectangular, square, polygonal, irregular, uniform, non-uniform, and tapered.

* * * * *